United States Patent [19]

Ramm

[11] Patent Number: 4,798,524

[45] Date of Patent: Jan. 17, 1989

[54] APPARATUS FOR FORMING CERAMICS

[75] Inventor: Eric J. Ramm, Lilli Pilli, Australia

[73] Assignee: Australia Nuclear Science & Technology Organisation, Australia

[21] Appl. No.: 936,161

[22] Filed: Dec. 1, 1986

[30] Foreign Application Priority Data

Nov. 29, 1985 [AU] Australia ............................ PH03649

[51] Int. Cl.[4] ............................................ B29C 43/52

[52] U.S. Cl. ................................ 425/77; 425/174.8 R; 425/193; 425/405.1; 425/406

[58] Field of Search ................ 425/77, 78, 193, 405.1, 425/174.8; 100/93 P, 224

[56] References Cited

U.S. PATENT DOCUMENTS

| | | | |
|---|---|---|---|
| 2,967,613 | 1/1961 | Ellis et al. | 425/78 |
| 3,555,597 | 1/1971 | Meadows | 425/78 |
| 3,704,969 | 12/1972 | Kennedy | 425/78 |
| 3,832,107 | 8/1974 | Cox et al. | 425/78 |
| 3,988,088 | 10/1976 | King et al. | 425/78 |

FOREIGN PATENT DOCUMENTS

| | | | |
|---|---|---|---|
| 504803 | 5/1939 | United Kingdom | 425/78 |

*Primary Examiner*—Willard E. Hoag
*Attorney, Agent, or Firm*—Ostrolenk, Faber, Gerb & Soffen

[57] ABSTRACT

An apparatus for hot uniaxial pressing of heat resistant metal canisters containing synthetic rock components.

A hydraulic press is provided in a furnace and has a fixed top press frame with refractory top pad and fixed base. The furnace comprises an electrical induction coil with a cylindrical metal sleeve functioning as a susceptor sleeve. The press is also provided with an upwardly acting hydraulic ram with ram head and refractory top pad.

A platen is provided on a ram having a mounting shaft. The ram is actuable to laterally displace the platen so that columns extending on opposed sides of the press and having respective recesses are arranged to engage with complementary portions of the platen.

The susceptor sleeve can be removed by swinging the platen around to extend below the region of the susceptor, but not into engagement with the column recesses, raising the platen and then releasing a clamping mechanism which normally grips the susceptor.

11 Claims, 3 Drawing Sheets

APPARATUS FOR FORMING CERAMICS

FIELD OF THE INVENTION

The present invention relates to the formation of ceramics and is more particularly concerned with the formation of a synthetic rock structure in which high level radioactive waste components are immobilised. The ceramic is formed under heat and pressure from a supply material comprising synthetic rock precursor components and radioactive waste. The radioactive waste could be high level nuclear waste usually derived in liquid form and impregnated into the synthetic rock precursor components which are calcined to produce a particulate material. Another application is to the case where the radioactive waste comprises spent nuclear fuel rods which are to be embedded in a synthetic rock matrix.

BACKGROUND OF THE INVENTION

The present applicants are the proprietors of a series of inventions in this field. Australian patent application no. AU-B65176/80 (531,250) describes a hot uniaxial pressing process including embodiments in which a canister having a generally cylindrical wall of bellows-like formation is used to contain the supply material to be pressed and while pressure is maintained by a hydraulic press, heating is applied and the synthetic rock product is formed as the bellows-like canister is axially compressed.

A further patent number AU-72825/82 (524,883) describes a development of the hot uniaxial pressing in which the pressing is conducted in an upward direction against a fixed top abutment in the press.

The art referred to in the above specifications includes prior art of The Australian National University describing the formation of synthetic rock from selected phases and suitable for the immobilisation of radioactive waste.

Typically, synthetic rock precursor is in the form of a fine powder and high-level radioactive waste is a liquid which must be impregnated into the powder in the active cell and pressing must also take place in an active cell. Extremely reliable mechanical handling methods and equipment are required since it is desired for the equipment to operate for tens of years with servicing and repairs conducted only through remote manipulators. In the pressing step, temperatures typically in the range 1050° C. to 1260° C. are experienced with pressures in the range 5 to 30 MPa, pressure being maintained for several hours. On a pilot plant scale, the compressed bellows-like canister incorporating the synthetic rock will have dimensions of the order of 30 cm diameter and 20 cm height and it is very important to achieve extremely high reliability in the pressing stage. For example, it is not acceptable to have a process in which the bellows-like canister might very occasionally split or rupture during the pressing stage since otherwise serious contamination problems would arise. Furthermore, the bellows-like canister must compress in a predictable axial manner with no substantial outward deformation or lateral slippage. The compression must be uniform to ensure proper formation of the synthetic rock structure and, furthermore, usually it will be required to place the canister in some outer container such as a steel cylinder for subsequent safe storage, transportation and disposal.

Active cells are very expensive and therefore a further requirement is that the equipment used in the process is as compact as possible, in addition to being as simple as possible to facilitate servicing; the apparatus used should minimise the capital cost involved in the entire process.

It has been found that a typical synthetic rock precursor powder impregnated with high level waste will be pourable to a packing density of about 19% of the theoretical maximum density whereas after the high temperature pressing step, a density of about 99% of the theoretical maximum density will be achieved. It has been found that such a product is extremely leach resistant.

The present invention is directed to new and useful developments which take into account effectively the general requirements summarised above for synthetic rock processes.

SUMMARY OF THE INVENTION

The present invention in part is based on the realisation that an effective and reliable hot uniaxial pressing of heat resistant metal canisters with a bellows-like cylindrical wall portion and containing synthetic rock components require a precompaction to increase the packing density within the bellows container before the bellows container and its contents are heated to the temperature at which the hot uniaxial pressing can take place. Without this step, reliable axial compression of the bellows container is not assured and there is the risk of lateral slippage of the container so that the end walls are not at right angles to the central axis of the compressed container. A further aspect of the invention is an efficient implementation of this concept by utilisation of the hydraulic press for use in the hot uniaxial pressing stage, the press having a removable secondary abutment structure (hereinafter referred to as a "platen") located below the heating zone, the primary abutment for the bellows like canister being at the top of the heating zone.

In a first aspect, the invention consists in an apparatus for hot uniaxial pressing of heat resistant metal canisters containing synthetic rock components, the canisters having a generally cylindrical wall incorporating bellows like formations, the apparatus comprising a hydraulic press having an upwardly acting ram with a refractory facing thereon for supporting the bottom of the canister, a fixed top abutment, a heating zone immediately below the abutment and adapted to surround the bellows container during the hot uniaxial pressing process and a retractable platen adapted to be inserted laterally into the press below the heating zone such that a bellows canister can be placed on the refractory facing and partially compressed at ambient temperature by upward displacement of the hydraulic press, the platen being removable to permit the press to be displaced upwardly to a higher level whereby the bellows like canister is inserted within the heating zone and abuts against the top abutment.

In a second aspect, the invention consists in a method of uniaxial pressing of canisters in which it is desired to form synthetic rock with high level waste immobilised therein, the method comprising

- pouring solid particulate supply material into a canister having a generally cylindrical wall incorporating a bellows-like formation, the supply material comprising synthetic rock precursor with high level waste components distributed therethrough,
- placing a closure lid on the canister, placing the canister on the facing plate of a hydraulic ram in an apparatus according to the first aspect of the invention in any one of its embodiments, raising the ram to apply an axial compression force to the canister by abutment on the platen, removing the pressure from the ram and removing the platen, raising the ram to insert the canister within the heating zone and allowing the canister and its contents to come to a sufficiently elevated temperature for synthetic rock formation, applying pressure through the ram by causing abutment of the top of the canister against a top abutment of the press while maintainging heating for sufficient time to form synthetic rock and to compress the canister so that the synthetic rock substantially approaches its theoretical maximum density, and removing the compressed canister with its synthetic rock content.

PREFERRED FEATURES OF THE PRESENT INVENTION

Preferably, the apparatus is such that the heating zone includes an induction heating furnace having a cylindrical metal sleeve adapted to surround a bellows like canister during the hot uniaxial pressing and to act as a susceptor sleeve. The heating unit can run continuously to facilitate rapid heating of the canister and its contents at the commencement of the heating stage. It is necessary to hold the canister in the heating zone for sufficient time to bring the contents up to an elevated temperature before pressure is applied to cause formation of the final synthetic rock stages.

The invention extends to an apparatus comprising an active cell for handling radioactive material in combination with an apparatus as described in any one of the above embodiments and the active cell having a floor through which the apparatus extends with seals between the floor and components of the apparatus at a location immediately below the zone for introducing canisters into the press, operating mechanisms for the press and hydraulic equipment being located below the floor and driving the moving components of the press through mechanical connections comprising sliding and rotary members.

Preferably, the platen is a rigid plate structure and is laterally displacable by a secondary hydraulic ram.

In a prefered embodiment the platen is mounted on a rotatable vertical shaft, rotatable about a vertical axis and adapted to be driven at a location lower than the platen.

In a preferred apparatus, the apparatus includes vertical press columns extending on opposed sides of the press and having respective recesses for accommodating complementary portions of the platen and for restraining vertical movement of the platen when loaded.

One very important embodiment of the invention is one in which the heating zone comprises an induction heating furnace and a metal susceptor sleeve mounted in respective clamping and connection devices, the clamping devices being capable of actuation remotely and vertical movement means being provided for the platen whereby it can be positioned immediately below the susceptor sleeve and the induction heating furnace for supporting and removing either or both of these components upon release of the associated clamping means. Thus, either of the components may be withdrawn to a clear space adjacent the press for removal by other handling equipment so that the components may be replaced.

The above described method includes inserting the canister within the heating zone either immediately after the cold precompaction or alternatively the canister can first be removed to a separate pre-heating furnace and after return from the pre-heating furnace the canister can then be inserted into the heating zone. By suitable control of work flow with this latter arrangement, when a canister has been precompacted against the platen and removed from the hydraulic ram another canister already pre-heated in the furnace may be moved to be placed on the ram and then subjected to the hot pressing operation. This arrangement maximises use of equipment and minimises expensive active cell space for the process.

BRIEF DESCRIPTION OF THE DRAWINGS

For illustrative purposes only embodiments of the invention will now be described with reference to the accompanying drawings wherein.

DETAILED DESCRIPTION OF THE INVENTION

Figure 1:
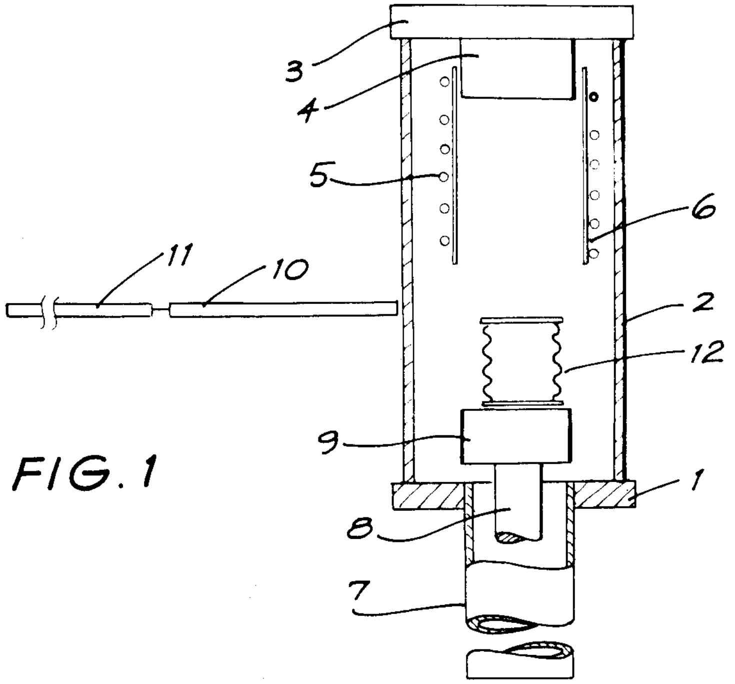
FIG. 1 is a schematic side elevation of a hydraulic press arranged in an active cell and ready for the first stage of cold precompaction.
Figure 2:
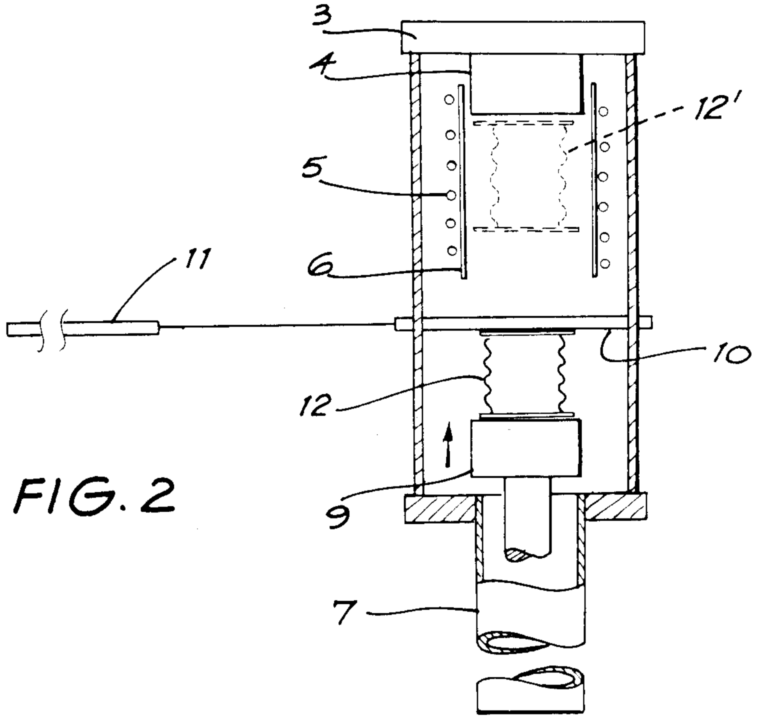
FIG. 2 is a view corresponding to FIG. 1 and showing the precompaction stage.

Referring to FIGS. 1 and 2, the hydraulic press comprises a fixed base 1, an open, upwardly extending framework 2, a fixed top press frame 3, a refractory top pad 4 and just below the top pad a heating unit comprising an electrical induction coil 5 with a cylindrical metal sleeve 6 functioning as a susceptor sleeve. Furthermore, the press has an upwardly acting hydraulic ram 7 with a ram head 8, on the top of which a refractory top pad 9 is mounted.

For the purpose of implementing the invention, the hydraulic press incorporates a retractable plate-like platen 10 which is horizontaly slidably displacable in guides (not shown) by actuation of a secondary ram 11.

FIG. 1 shows the first stage in which a bellows canister 12 has been placed on the refractory bottom pad 9. The canister is of a heat resistant alloy or steel such as INCONEL 601 and includes synthetic rock precursor in powder form in which high level waste has been distributed. A typical density will be 19% of the maximum theoretical density of the final synthetic rock. A cold precompaction is applied by first actuating the ram 11 to displace horizontally the platen 10 to adopt the position shown in FIG. 2 and then the hydraulic ram 7 is actuated to place the bellows canister 12 into abutment with the platen 10. Pressure is maintained until the density of the synthetic rock powder approaches the maximum which can be achieved at ambient temperatures, e.g. about 35% theoretical maximum density. Typically, the press will be operating at about 20 MPa and the time for this pressing step will be the order of 3 minutes.

The ram 7 is then lowered slightly, the ram 11 actuated to retract the platen 10 and then the ram 7 is raised to place the bellows container within the heating zone and to occupy the position shown in dotted lines and referenced 12'. It is necessary first to heat the bellows container and its contents to a typical temperature in the range of 1050° to 1260° C. and this will take typically 510 minutes for a 40 cm diameter bellows container. Subsequently, pressure can be applied through the ram while heating is maintained, the bellows canister being in abutment with the top pad 4 with a uniaxial applied pressure of about 14 MPa or higher for several hours until full compression of the bellows canister occurs. A density of about 99% theoretical density is achieved.

It will be appreciated that during normal operations the induction coil is continuously operated and appropriate insulation material surrounds the upper part of the press to reduce heat losses. However, the bottom pad 9 is itself raised to very high temperatures and as soon as the canister 12 is placed on top of the pad there will be a heat flow into the metal forming the walls of the canister. It has, interestingly, been found that nevertheless, an effective precompaction can occur in the manner described above and the shape of the bellows container achieved during the final hot uniaxial pressing stage is highly predictable and repeatable.

Figure 3:
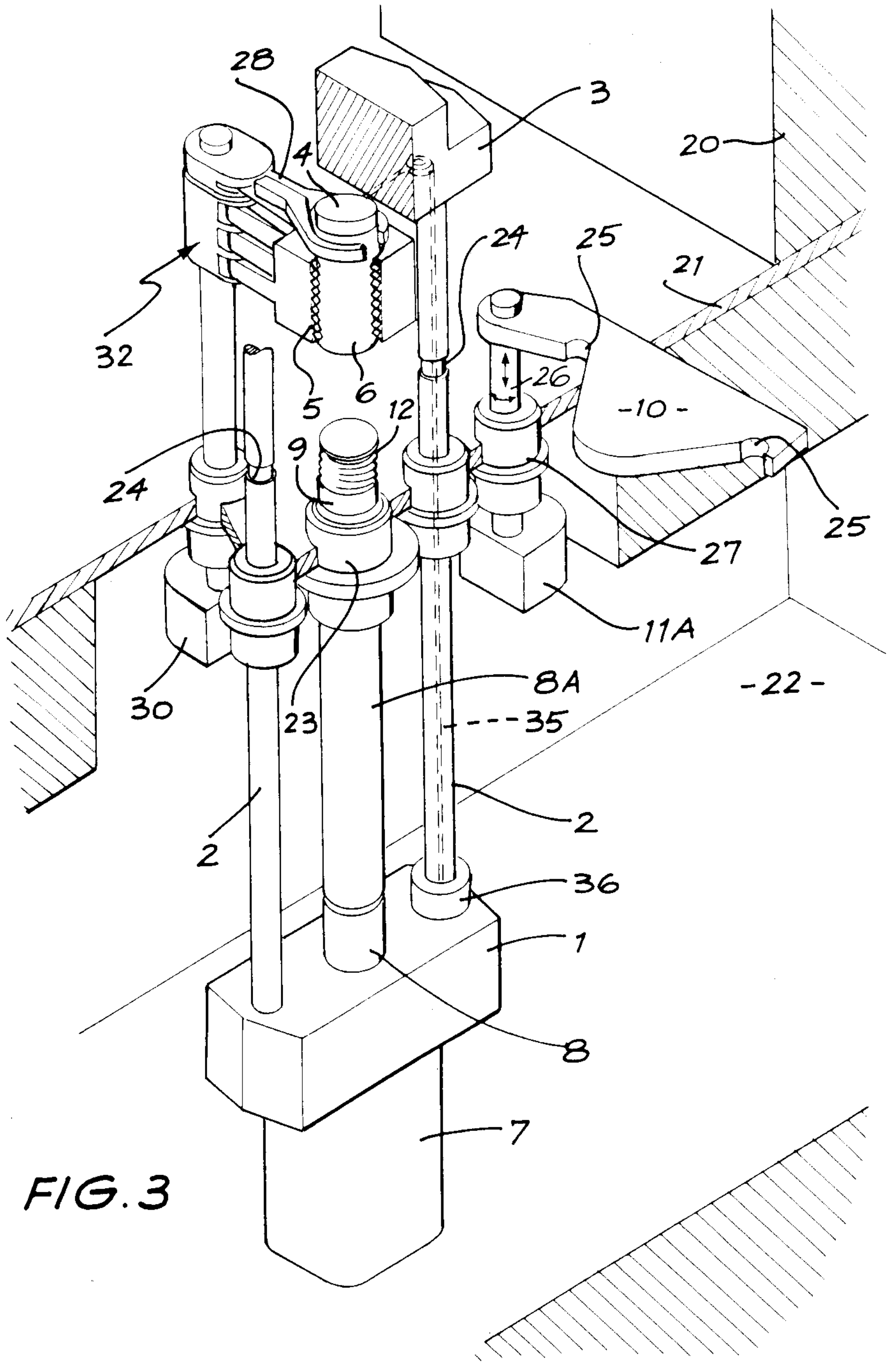
FIG. 3 is a schematic isometric view of a second embodiment of the hydraulic press arranged in an active cell.
Figure 4:
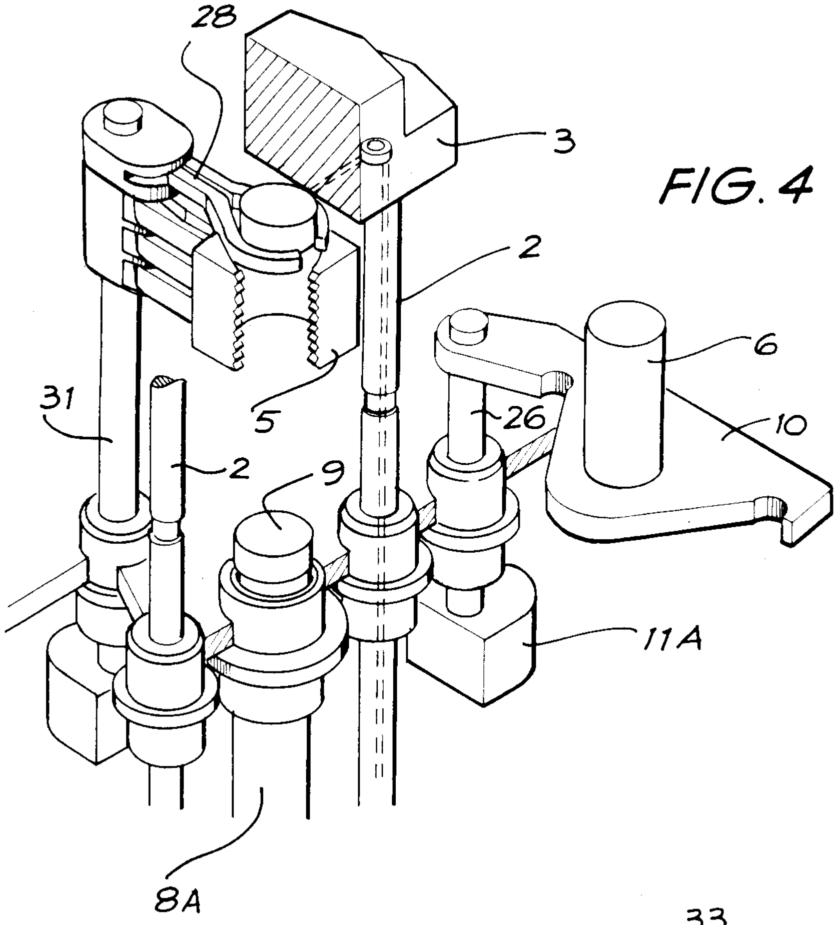
FIG. 4 is a partial view of the press illustrating use of the platen for removal of a metal susceptor sleeve.
Figure 5:
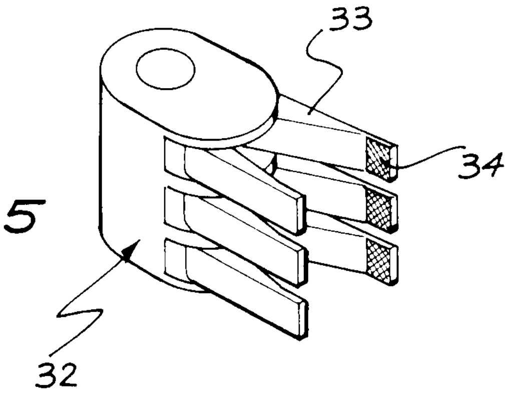
FIG. 5 is an enlarged isometric view of a gripper unit for mounting the induction heating furnace of the press.

Reference will be now made to the preferred embodiment of FIGS. 3 to 5. Like parts have been given like reference numerals and description will be given only of the different characterising features.

FIG. 3 illustrates the apparatus in an active cell having walls 20 and a partition floor 21 above which all radioactive material is confined and below which a machinery chamber 22 is provided and which houses the actuating mechanisms and hydraulic system for the press. Seals are provided on the components which extend through the floor 21 and as all movements are either rectilinear or rotary it is practical to provide seals with long working lives and contamination of the machinery in the chamber 22 can be obviated. Furthermore, access by personel into the chamber 22 for servicing purposes would be possible.

The hydraulic ram 7 has a transfer ram 8A mounted on the ram head 8, the transfer ram 8A moving through a ram guide 23 upon operation of the ram. The guide has a seal arrangement which wipes the transfer ram and this arrangement ensures that no hydraulic equipment is in the active cell itself and in the event of slippage of radioactive material only very limited contamination should occur in the chamber 22; contamination should be confined to the cylindrical transfer ram 8A which can be decontaminated. The press framework 2 is in the form of a pair of columns having respective undercut locking sections 24 dimensioned to be slightly longer than the thickness of the platen 10. The platen has corresponding shoulders 25 so that upon actuation of its rotary drive mechanism 11A, the platen 10 is swung around to engage the undercut sections. The platen drive mechanism 11A also includes vertical control of the mounting shaft 26 to which the platen is fixed. The shaft 26 extends through a sealing guide 27 in the floor 21. The purpose of the vertical adjustment is to permit removal and replacement of parts of the furnace namely the susceptor 6 and the induction furnace 5.

As shown in FIG. 4 the susceptor 6 can be removed by swinging the platen around to extend below the region of the susceptor but not engaging the undercuts 24, raising the platen 10 to abut the susceptor and then releasing a clamping mechanism 28 which normally grips the susceptor. The susceptor 6 is then supported on the platen which may be lowered and pivoted away from the press zone for removal by other handling equipment such as an overhead crane.

It will be noted that the clamping mechanism 28 is actuated by a control mechanism 30 located below the floor 21 and connected through a tubular mounting post 31. Similarly a gripping mechanism 32 for the induction furnace is mounted on the tubular post 31 and actuated also by the mechanism 30 as required. As best shown in FIG. 5, the clamping mechanism 32 comprises three pairs of gripping arms 33 having service connectors 34 at the tips thereof and connecting with corresponding connections in the induction furnace 5 for supplying high frequency electrical power and cooling water. These services are supplied also through the post 31.

The refractory top pad 4 is attached to the top press frame 3 by locking pins not shown in the drawing. Insertion and removal of the pins is controlled by drive shaft 35 located inside the right hand column 2 and actuated by a control mechanism 36 at the base of the column and below the floor 21. For removal of the refractory pad 4, the ram 7 is actuated so that the transfer ram 8A comes into abutment with the top pad 4, the mechanism 36 is actuated to withdraw locking pins and then the ram is lowered to the position shown in FIG. 3. A gripper type manipulator can then grip sides of the refractory pad and remove it so it may be replaced in the same manner as that in which a bellows container is handled.

We claim:

1. An apparatus for hot uniaxial pressing of heat resistant metal canisters containing synthetic rock components, the canisters having a generally cylindrical wall incorporating bellows-like formations, the apparatus characterised by a hydraulic press having an upwardly acting ram with a refractory facing thereon for supporting the bottom of the canister, a fixed top abutment, a heating zone immediately below the abutment and adapted to surround the canister during the hot uniaxial pressing process and a retractable platen adapted to be inserted laterally into the press below the heating zone such that a canister can be placed on the refractory facing and partially compressed at ambient temperature by upward displacement of the hydraulic press, the platen being removable to permit the press to be displaced upwardly to a higher level whereby the bellows-like canister is inserted within the heating zone and abuts against the top abutment.

2. An apparatus according to claim 1, characterised in that the platen is a rigid plate structure displaceable laterally.

3. An apparatus for hot uniaxial pressing of heat resistant metal canisters containing synthetic rock components, the canisters having a generally cylindrical wall incorporating bellows-like formations, the apparatus characterized by a hydraulic press having an upwardly acting ram with a refactory facing thereon for supporting the bottom of the canister, a fixed top abutment, a heating zone immediately below the abutment and adapted to surround the canister during the hot uniaxial pressing process and a retractable platen adapted to be inserted laterally into the press below the heating zone such that a canister can be placed on the refractory facing and partially compressed at ambient temperature by upward displacement of the hydraulic press, the platen being removable to permit the press to be displaced upwardly to a higher level whereby the bellows-like canister is inserted within the heating zone and abuts against the top abutment, the platen being a rigid plate structure displaceable laterally and mounted on a shaft and rotatable about a vertical axis, drive means for rotating the shaft being located at a lower level than the zone in which pressing takes place.

4. An apparatus according to claim 2, characterised by vertical press columns extending on opposed sides of the press and having respective recesses for accomodating complementary portions of the platen and for restraining vertical movement of the platen when loaded.

5. An apparatus according to claim 4, characterised in that the heating zone includes an induction heating furnace having a cylindrical metal sleeve adapted to surround a bellows-like canister during the hot uniaxial pressing and to act as a susceptor sleeve.

6. An apparatus according to claim 5, characterised in that the induction heating furnace and metal susceptor sleeve are mounted in respective clamping and connection devices, the clamping devices being capable of actuation remotely and vertical movement means being provided for the platen whereby it can be positioned immediately below the susceptor sleeve and the induction heating furnace for supporting and removing either or both of these components upon release of the associated clamping means.

7. An active cell apparatus for handling radioactive material, in combination with a press apparatus according to claim 6, characterised in that the active cell apparatus has a floor through which the press apparatus extends with seals between the floor and all components of the press apparatus pressing through the floor at a location immediately below the zone for introducing canisters into the press, operating mechanisms for the press being located below the floor and driving the moving components of the press through mechanical connections comprising sliding and rotary members.

8. An apparatus for hot uniaxial pressing of heat resistant metal canisters containing synthetic rock components, the canisters having a generally cylindrical wall incorporating bellows-like formations, the apparatus characterized by a hydraulic press having an upwardly acting ram with a refactory facing thereon for supporting the bottom of the canister, a fixed top abutment, a heating zone immediately below the abutment and adapted to surround the canister during the hot uniaxial pressing process and a retractable platen adapted to be inserted laterally into the press below the heating zone such that a canister can be placed on the refractory facing and partially compressed at ambient temperature by upward displacement of the hydraulic press, the platen being removable to permit the press to be displaced upwardly to a higher level whereby the bellows-like canister is inserted within the heating zone and abuts against the top abutment, the platen being a rigid plate structure displaceable laterally and vertical press columns extending on opposed sides of the press and having respective recesses for accommodating complementary portions of the platen and for restraining vertical movement of the platen when loaded.

9. An apparatus according to claim 8, characterized in that the heating zone includes an induction heating furnace having a cylindrical metal sleeve adapted to surround a bellows-like canister during the hot uniaxial pressing and to act as a susceptor sleeve.

10. An apparatus according to claim 9, characterized in that the induction heating furnace and metal susceptor sleeve are mounted in respective clamping and connection devices, the clamping devices being capable of actuation remotely and vertical movement means being provided for the platen whereby it ca be positioned immediately below the susceptor sleeve and the induction heating furnace for supporting and removing either or both of these components upon release of the associated clamping means.

11. An active cell apparatus for handling radioactive material, in combination with a press apparatus according to claim 10, characterized in that the active cell apparatus has a floor though which the press apparatus extends with seals between the floor and all components of the press apparatus pressing through the floor at a location immediately below the zone for introducing canisters into the press, operating mechanisms for the press being located below the floor and driving the moving components of the press through mechanical connections comprising sliding and rotary members.

* * * * *